No. 770,471. PATENTED SEPT. 20, 1904.
J. W. MOSHIER.
MACHINE FOR MAKING METAL BARS OR RODS.
APPLICATION FILED NOV. 30, 1903.
NO MODEL. 5 SHEETS—SHEET 1.

Witnesses.
S. H. Clarke
Herbert S. Woods

Inventor.
James W. Moshier.
By James Shepard.
Atty.

No. 770,471. PATENTED SEPT. 20, 1904.
J. W. MOSHIER.
MACHINE FOR MAKING METAL BARS OR RODS.
APPLICATION FILED NOV. 30, 1903.
NO MODEL. 5 SHEETS—SHEET 3.

Witnesses.
S. H. Clark
Herbert S. Woods

Inventor.
James W. Moshier
By James Shepard
Atty.

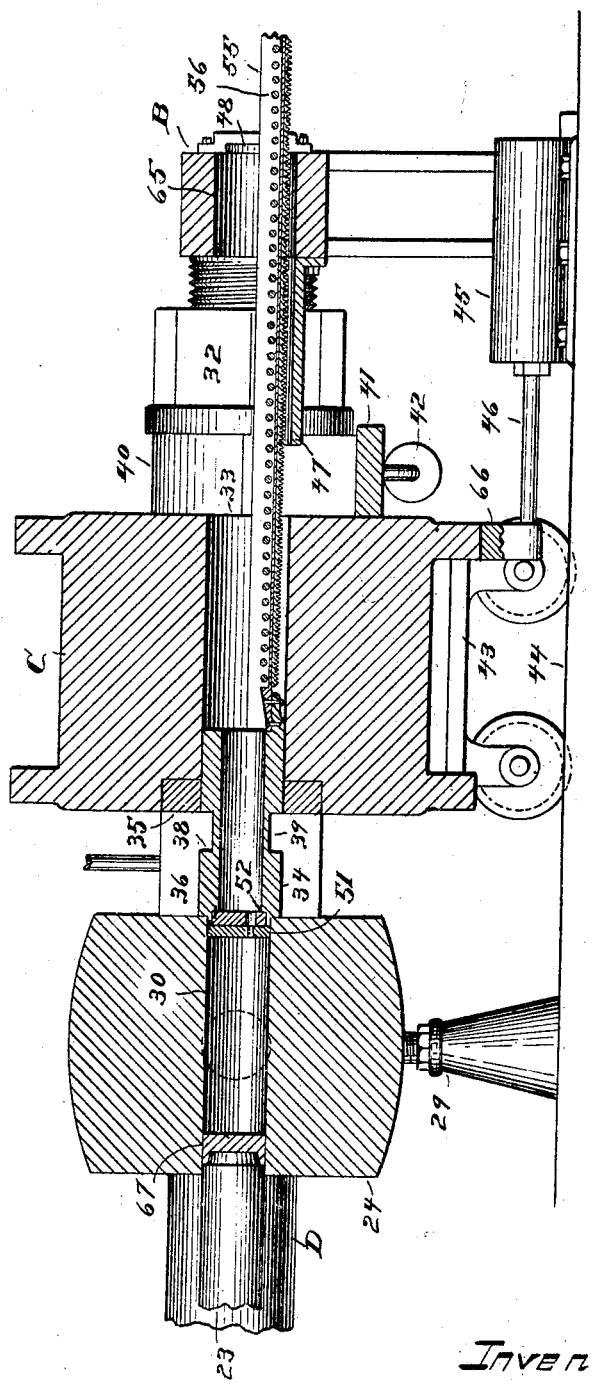

No. 770,471. PATENTED SEPT. 20, 1904.
J. W. MOSHIER.
MACHINE FOR MAKING METAL BARS OR RODS.
APPLICATION FILED NOV. 30, 1903.
NO MODEL. 5 SHEETS—SHEET 5.
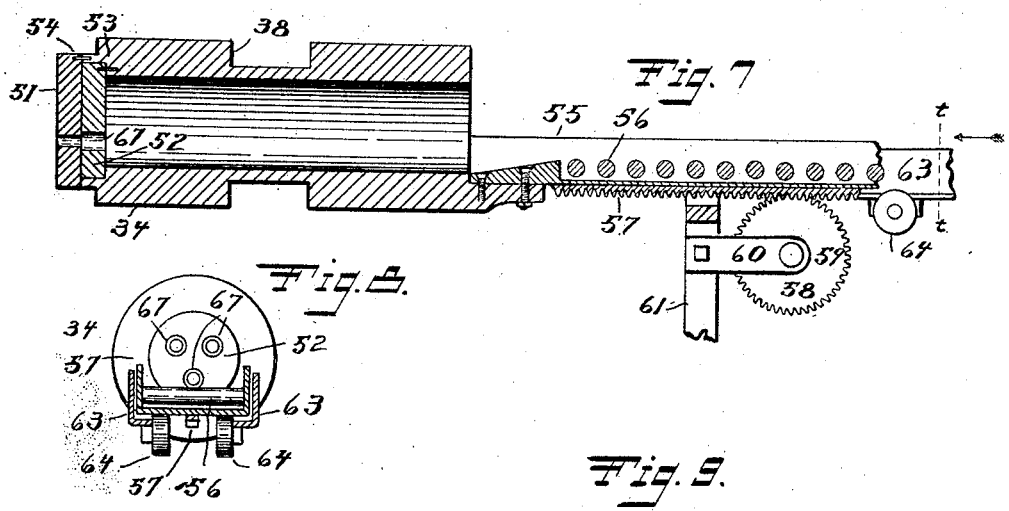
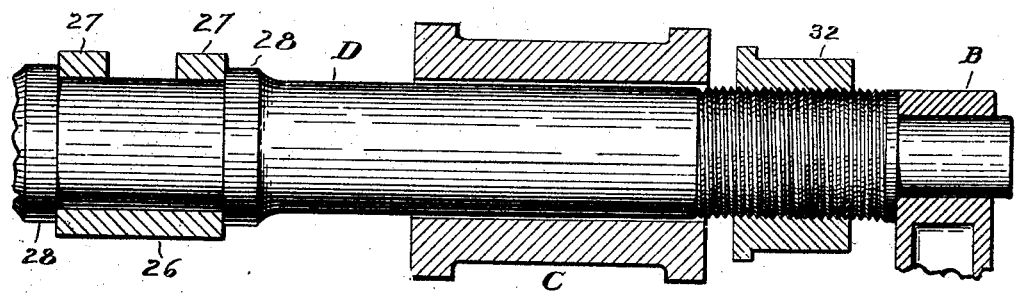
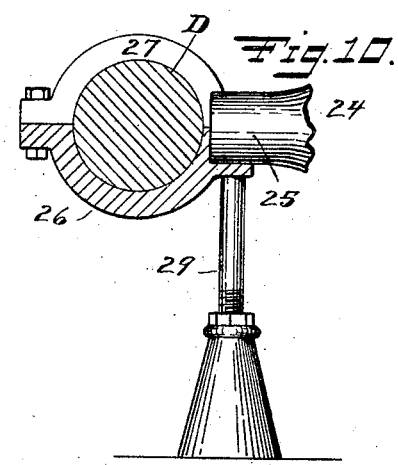

No. 770,471.

Patented September 20, 1904.

UNITED STATES PATENT OFFICE.

JAMES W. MOSHIER, OF BRISTOL, CONNECTICUT.

MACHINE FOR MAKING METAL BARS OR RODS.

SPECIFICATION forming part of Letters Patent No. 770,471, dated September 20, 1904.

Application filed November 30, 1903. Serial No. 183,191. (No model.)

*To all whom it may concern:*

Be it known that I, JAMES W. MOSHIER, a citizen of the United States, residing at Bristol, in the county of Hartford and State of Connecticut, have invented certain new and useful Improvements in Machines for Making Metal Rods or Bars, of which the following is a specification.

My invention relates to machines for making metal rods, tubes, or bars from hot metal under pressure; and the objects of my improvement are convenience and efficiency in operation and economy in production.

Figure 1:
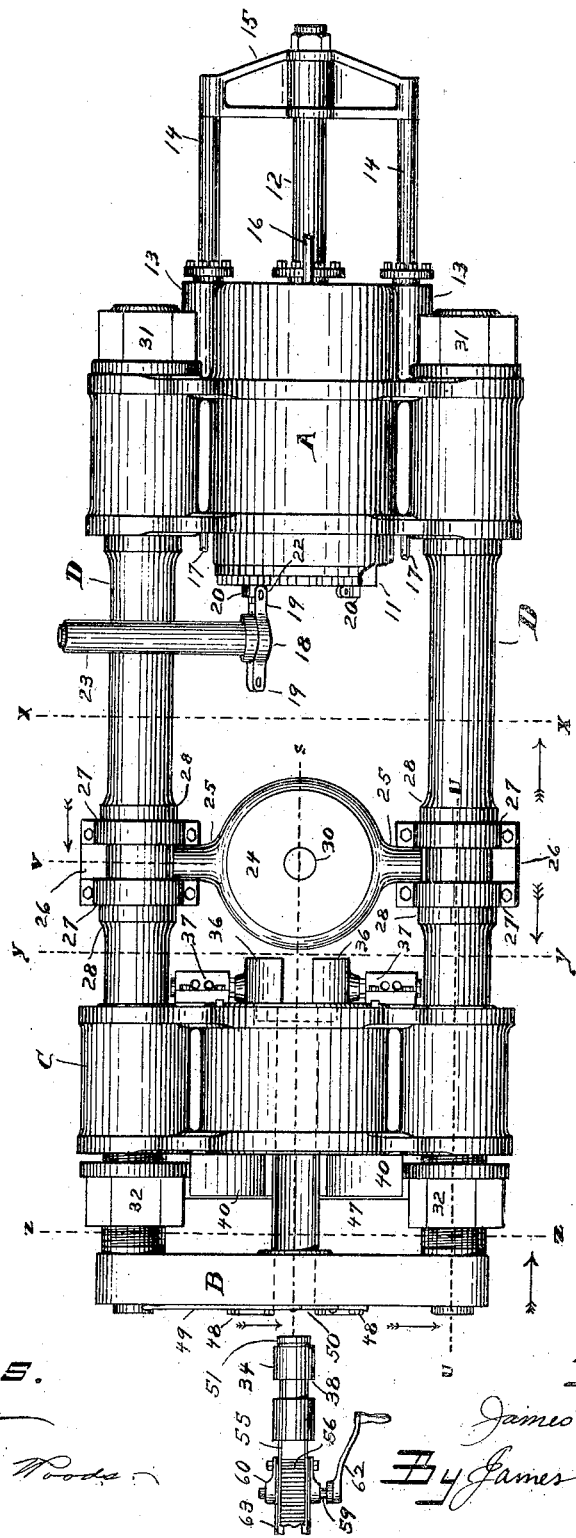
Figure 2:
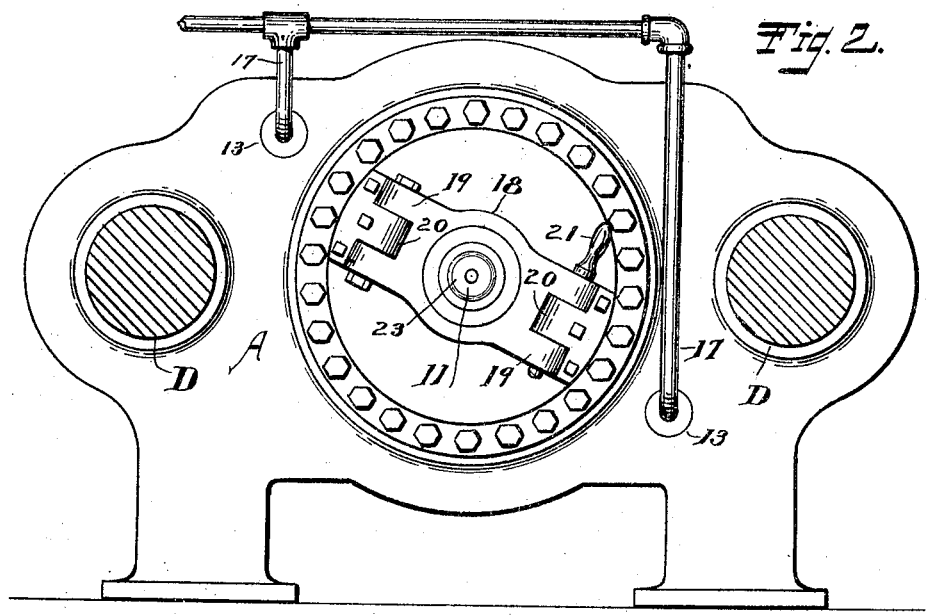
Figure 3:
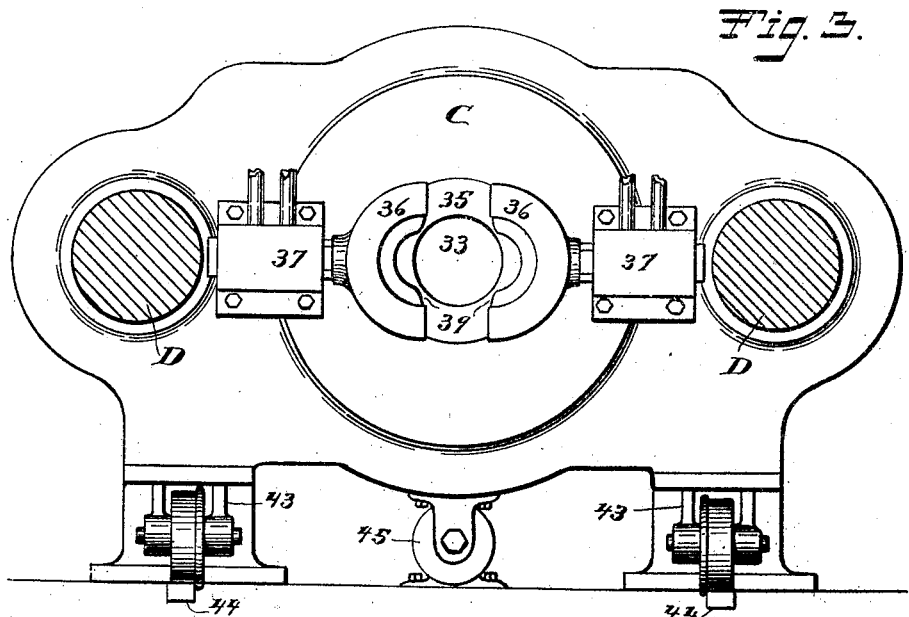
Figure 4:
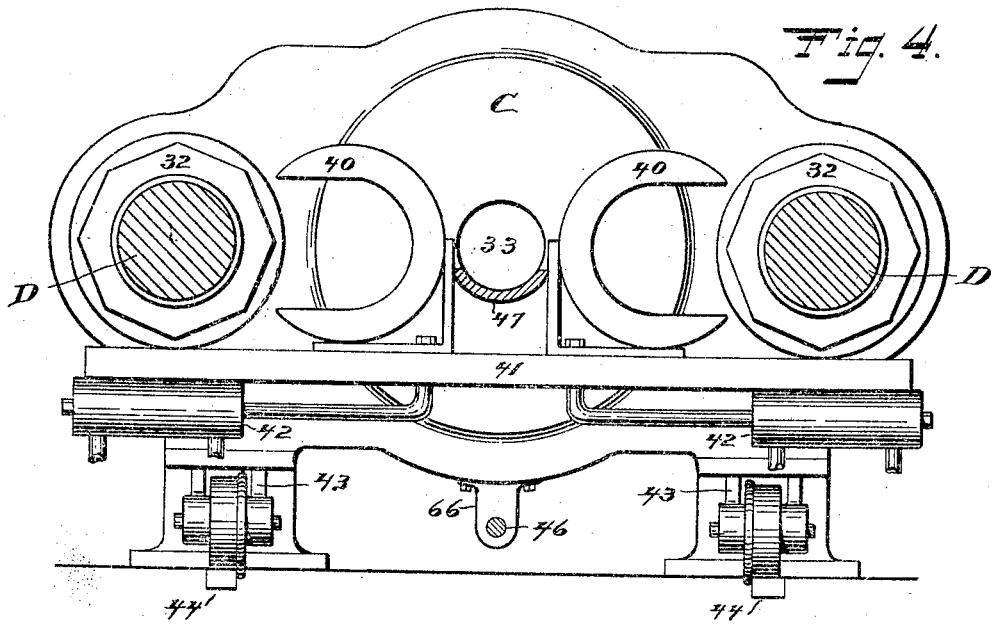
Figure 5:
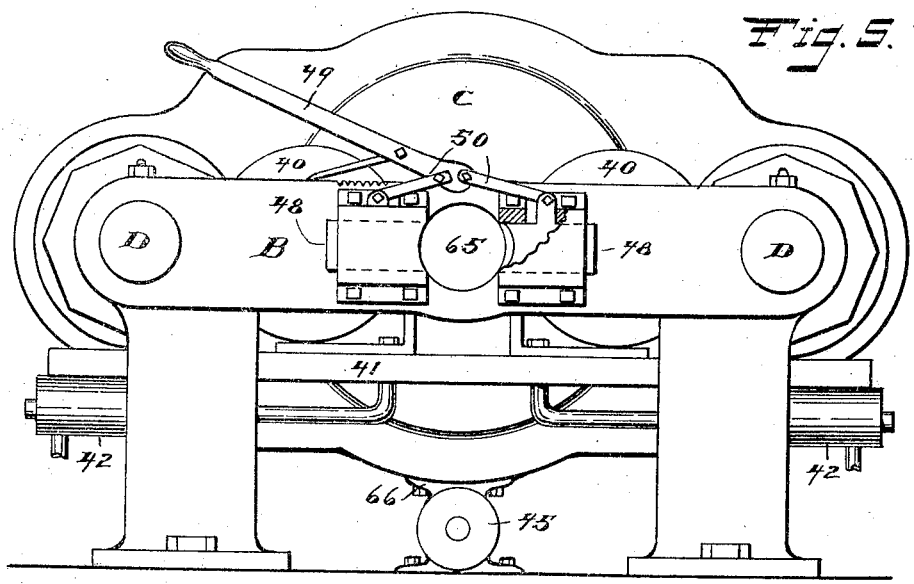

In the accompanying drawings, Figure 1 is a plan view of my machine with parts broken away, the machine being represented in position for being charged with molten metal. Fig. 2 is an enlarged sectional view of the same on the line $x\ x$ of Fig. 1, the piston being moved from the position shown in Fig. 1 to its central and working position. Fig. 3 is a sectional view on the line $y\ y$ of Fig. 1 with the parts in the same position as in the said Fig. 1. Fig. 4 is a sectional view on the line $z\ z$ of Fig. 1. Fig. 5 is a broken-out end view of the machine, showing the delivery end with the die-holder and connected mechanism removed. Fig. 6 is a sectional view, partly in elevation, on the line $s$ of Fig. 1 with the receiver and its piston arranged in line with each other and with the die-holder and die moved forward into position for use. Fig. 7 is a central longitudinal section, enlarged from Fig. 6, showing the die, die-holder, and the principal parts connected therewith. Fig. 8 is an end view of the die-holder and die, together with a transverse section of the delivery-chute, on the line $t\ t$ of Fig. 7. Fig. 9 is a sectional elevation of parts of the machine on the line $u\ u$ of Fig. 1, the scale being the same as in Figs. 2 to 6. Fig. 10 is a sectional elevation of parts of the machine on the line $v$ of Fig. 1.

A designates the main cross-head or major end piece of the frame, and B the end piece at the delivery end of the machine. These end pieces A B are connected by side rods D D, which, with the said end pieces, constitute the main frame of the machine. Within a proper cylinder or chamber in the middle of the major end piece A is a hydraulic ram 11, Figs. 1 and 2, with its rigid stem 12 projecting from one side or end, while the ram itself may be projected from the opposite side of the said end piece A. Two lesser cylinders, as at 13, and rams with rigid stems 14 are arranged on each side of the main ram with the said stems rigidly connected by the cross-frame 15. A pipe 16 communicates with the chamber of the main ram at the right-hand end thereof as viewed in Fig. 1, while pipes 17 communicate with the left-hand ends of the chambers for the lesser rams. These pipes connect with suitable pumps whereby when water is forced into the chamber of the main ram 11 through the pipe 16 the opposite end of the said ram is forced outwardly and the water in the lesser chambers is forced out through the pipes 17. For returning the ram water is forced into the chambers of the lesser rams through the pipes 17 and flows out of the chamber for the main ram through the pipe 16. This is an ordinary construction of hydraulic ram, and any other mechanism for operating the ram with a powerful pressure may be substituted for the ram herein illustrated and described and when so substituted will be considered an equivalent therefor.

The base or end of the piston 23 is in the form of a cross-piece 18 having a flat and square rear face that seats squarely on the flat front face of the ram 11 and laterally-projecting hinge-lugs 19 formed at the respective ends of the said cross-piece. The flat front face of the ram 11 is provided with companion hinge-lugs 20, to one of which the said piston is hinged by the bolt or pintle 22. A loose or detachable pintle 21, Fig. 2, is provided for the non-hinging pair of hinge-lugs, which may be inserted as in said Fig. 2 when desired to fasten both ends of the cross-piece 18 to the ram and which may be pulled out, so as to permit the piston to be swung out of the way on the pintle 22, as shown in Fig. 1.

I have described the parts at each end of the cross-piece 18 of the piston as hinge-lugs and pintle, although such parts constitute a hinge proper only at one end of the said cross-piece, while the parts at the other end are in practice nothing but a detachable fastening device. It is only for convenience of construction that I make both ends of the crosspiece and connecting parts alike. I prefer to arrange this cross-piece in an oblique position and in about as nearly a horizontal position as practicable and have the piston swing clear of the side rods D. The pintle or bolt 22, upon which the piston swings, is at the left-hand upper end of the cross-piece 18, so that the piston may be turned to one side with its outer end projecting over the top of the side rod D on that side, as shown in Fig. 1.

This machine is for heavy work and quite large, so that the drawings are necessarily on a small scale. The machine from which the drawings were made is used in producing three solid brass rods seven-eighths of an inch in diameter at one time or three solid brass rods five-eighths of an inch in diameter.

Any suitable pulling or lifting arrangement (not shown) may be used to swing or pull the piston around into the position shown in Fig. 1 and to hold it in the said position.

The piston, the main ram, and the stem of the said ram are bored axially, as usual in this class of machines in order to arrange for a core in any ordinary manner when the machine is to be used for making tubes instead of solid rods or bars.

The receiver or cylinder 24 may be of any desired material or materials and of any approved construction. It is preferably removable by being mounted on trunnions 25, with the said trunnions journaled in open trunnion-blocks supported in part on the side rods D. The said blocks are each formed of a half-block 26, that is recessed from the top downwardly to removably receive one end of one trunnion, which half-block forms the trunnion-block proper. Two straps 27 are secured to the half-block 26 at each side of the trunnion-recess, whereby the trunnion-blocks are clamped to the side rods D between two shoulders 28, so that they cannot move longitudinally on the said rods. In order to prevent the said blocks from turning on the side rods, a screw-jack or longitudinally-adjustable post 29 is placed under each trunnion-block on that side in which the open trunnion-recesses are formed, so as to be directly under each trunnion, as illustrated for one of the said trunnions in Fig. 10. The main cross-head or ram-cylinder and the trunnion-blocks are relatively located to each other and with reference to the length of the receiver and piston so that when the receiver and piston are in their horizontal position and in alinement with each other the ram may be run back far enough to wholly withdraw the piston and permit it to be swung to one side into the position shown in Fig. 1 without changing the position of the receiver. The receiver has a cylindrical bore 30 extending through it from end to end.

C designates a movable cross-head through the ends of which the side rods D D extend and which when locked in position on the said rods becomes the bed of the press. The side rods D D are firmly held in the main cross-head or end piece A by means of the nuts 31, and a portion of each side rod back of the movable cross-head C is threaded and provided with a nut 32. The said movable cross-head is bored centrally, as at 33, of a diameter that the largest diameter of the die-holder 34 will substantially fit and allow the said die-holder to move therethrough. The front of this bore is provided with a let-in steel bushing 35, the face of which is flush with the face of the cross-head. A pair of sliding jaws 36 are mounted on the front face of the said cross-head at each side of the bore therethrough, the said jaws being operated to open and close them by any suitable mechanism—as, for example, hydraulic rams 37. The die-holder 34 is cylindrical, with an annular recess to form the holding-shoulder 38. The jaws 36 are substantially semicylindrical on the grasping-faces and of a size to substantially fit the larger diameter of the die-holder and are also formed with a flange 39 for entering the recess in the die-holder to engage and support the holding-shoulder 38, as shown in Fig. 6. The said jaws open far enough to let the die-holder pass longitudinally through them when they are fully opened, as shown in Fig. 3.

Upon the rear face of the movable cross-head C there is a pair of sliding blocks 40, substantially U-shaped, so as to form gap-sleeves for partially surrounding the side rods to serve as filling-blocks for the nuts 32 when the said blocks are moved outwardly to interpose them between the rear face of the movable cross-head C and the said nuts, as shown for one of the said blocks in Fig. 6. These blocks are arranged to slide on the cross-support 41 and may be operated by any suitable means—as, for example, the hydraulic rams 42. The object of these filling-blocks is to shorten the length of the threaded portion of the slide-rods and to save the time that would be required to turn the nuts if they directly engaged the cross-head. While the side rods D pass through the ends of the movable cross-head C and in a sense said cross-head is moved on the said rods, the bore of the said cross-head for the side rods is of a larger diameter than that portion of the said side rods that passes through the cross-head, as shown in Fig. 9, and the said cross-head is supported on suitable roller-trucks 43 and tracks 44, as shown in Figs. 4 and 6, so that the weight of the said cross-head bears upon the said trucks and tracks instead of bearing on the side rods. The cross-head C and its trucks are moved longitudinally on the side rods by any suitable mechanism—as, for example, the hydraulic ram 45, the stem 46 of which is connected with a bracket 66 on the underside of the cross-head C, as shown in Figs. 4, 5, and 6. The end piece B at the delivery end of the machine has a central bore 65, Figs. 5 and 6, of the same diameter as the central bore of the movable cross-head C and in alinement therewith. Extending forwardly toward the movable cross-piece there is an apron or guide 47 on the end piece B, with its upper concave face about flush with the central bore 65. The said apron is of a length to substantially meet the cross-head C when the cross-head is moved into its rearmost position, thereby making, in connection with the bore of the cross-head and end piece, a concave support for the die-holder to move over that is substantially continuous from the front of the cross-head C to the rear of the end piece B. On the rear side of the end piece B there is a pair of grasping-jaws 48, operated by the lever 49 and toggle-links 50 for moving the said jaws inwardly until their confronting and concave ends approach each other nearly enough to engage the periphery of the die 51 for holding the said die against being moved rearwardly with the die-holder, the said ends of the said jaws being concaved on the arc of a circle approximating that of the said die. The diameter of the die 51 is substantially the same as the bore 30 of the receiver 24, so that the die may enter the end of the receiver and fill the bore thereof, as shown in Fig. 6. The die-holder 34 is provided with a short cylindrical portion at its front end of the same diameter as the die. It is also recessed internally to receive the die block or backing 52. A dowel-pin 53, with proper sockets in the said die-block and die-holder, governs the position of the said die-block in the die-holder circumferentially. A dowel-pin 54, Fig. 7, locates the position of the die on the end of the die-holder in like manner.

A chute or conductor 55, provided with bottom rollers 56, is attached to the rear end of the die-holder and is provided on its under side with a rack 57 for engagement with a gear-wheel or pinion 58 for moving the die-holder from the position shown in Fig. 1 to that shown in Fig. 6. The said gear-wheel or pinion 58 is mounted on a shaft 59, that is journaled in a bracket 60 upon the upright 61, the said shaft being provided with means for driving it—as, for example, a crank 62. A pair of angle-irons 63 have one of their ends supported on the upright 61 for the conductor 55 to move in, the said angle-irons having mounted in suitable bearings the rollers 64, that project upwardly a little from their inner confronting edges for the bottom of the conductor 55 to roll upon as the said conductor is moved within these angle-irons. The conductor and supporting angle-irons may be of any desired length, the said irons being supported at other points on other uprights similar to the upright 63, but not shown, so as to lead to any suitable point. The die 51 and die-block 52 may be perforated with one or more holes of a round or other form, according to the shape in cross-section of the rods or bars to be produced. As shown, the said die and die-block are provided with three holes 67, Fig. 8.

In Fig. 2 I have shown the piston as provided with a central bore in order to adapt the machine, if desired, for making tubes as well as rods.

While the machine is intended mainly for working brass or analogous metal when hot, it is capable of working softer metal when cold.

The operation of the machine for making brass rods from heated metal is as follows: The brass or alloy may be poured into the receiver in a molten state or the receiver may be charged with red-hot billets. The receiver is preferably heated before use, and it is removably mounted, so that it may be heated in any suitable heater and then readily placed in position for use. When molten metal is to be poured into the receiver, the parts are arranged in the position shown in Fig. 1 and the lower end of the receiver is closed by a temporary stopper. (Not shown.) It is then filled with the molten metal and a steel plug-piston 67, Fig. 6, inserted at the upper end. The receiver is then swung on its trunnions from the position shown in Fig. 1 to its horizontal position. By this time a partially-chilled crust will be formed on the heated metal, so that the said metal will not run out, and hence the temporary stopper may be removed. The die and die-holder are then moved from the position shown in Fig. 1 to carry them through the passage in the end piece B and movable cross-head C and the die and reduced end of the die-holder entered into the receiver until the shoulder at the junction of the reduced and larger diameters of the die-holder engages the end of the receiver and stops the movement of the die-holder in that direction. The movable cross-head C is then moved up to the receiver until the sliding jaws 36 abut against the confronting end of the receiver. This will bring the said jaws into a position with their flanges 39 by the side of the recess and shoulder 38 of the die-holder and also bring the sliding filling-blocks 40 opposite the space between the ends of the nuts 32 and rear side of the said cross-head C. The jaws 36 are then forced toward each other upon the die-holder and the blocks 40 away from each other and upon the side rods D. The nuts 32 are then tightened up, so as to press upon the filling-blocks substantially the same as if the said receiver, die, and connected parts rested upon a bed-piece or cross-head that was rigid with the said side rods for throwing all the pressure upon the side rods D through the said nuts. The piston 23 is let down from the position shown in Fig. 1 to that shown in Fig. 2 and the ram is started to force the piston into the receiver, all as shown in Fig. 6. For clearness of illustration no attempt has been made to show the metal in the receiver. As the piston advances the metal is forced out through the hole or holes in the die and passes through the conductor to any desired receptacle. The advance movement of the piston should be stopped and the pressure released before the end of the steel plug 67 reaches the die. The jaws 36 are operated to release the die-holder, and the ram is then started again to push the steel piston-plug and metal remaining in the receiver out of the same, carrying the die and die-holder with the metal thus pushed out. The ram may then be reversed to withdraw the piston. In case there is any tendency of the piston to stick in the receiver so as to pull on the hinge-lugs the detachable pin 21 may be inserted, so as to bring the said pull evenly on both sides of the cross-piece 18. This pin 21 may be inserted, if desired, when the piston is first let down into place, but the piston by being hung as before described will properly seat itself in position for use without inserting the said pin, and many times the piston may be withdrawn without inserting the said pin at all. The die-holder, the die, and metal all being thus freed from the receiver may now be drawn back together and stopped when the die reaches a position between the slides 48. The slides are then operated by the lever 49 to grasp the said die to hold it against moving, while the die-holder is pulled back sufficiently to permit the rods or bars that project through the die to be cut off, and thus liberate the rods or bars and also release the die and remaining metal, so that upon removing the metal from the die the parts may be again arranged for repeating the operation. If molten metal is to be used again, the nuts 32 are loosened, the filling-blocks 40 withdrawn from the side rods, and the movable cross-head run back, so as to enable the receiver to be turned on its trunnions into the position shown in Fig. 1.

When desired to use a heated billet or ingot instead of molten metal, the movable cross-head is not run back and the receiver may be charged when in its horizontal position, the swinging of the piston into the position shown in Fig. 1 making room enough to permit an ingot to be so inserted. After charging the machine the operation is the same in both cases.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

I claim as my invention—

1. The combination of the horizontally-arranged ram having a square-faced front with the piston having a square rear end for seating squarely on the said square end of the said ram; and a hinge located to one side of the body of the piston at its rear end for mounting the said piston on the said ram for swinging the said piston to one side, the axis of the said hinge being extended in an oblique direction and located to one side of and above the axis of the said piston.

2. The combination of a frame having side rods with the trunnion-blocks clamped against moving longitudinally thereon, the receiver having trunnions by which the said receiver is mounted in the said blocks, and the adjustable supports under the said trunnion-blocks upon that side of the said side rods at which the receiver-trunnions are located.

3. The combination of the frame having side rods with the movable cross-head arranged to move longitudinally of the said side rods, nuts on the said side rods for holding the said cross-head in place, the receiver arranged in front of the said movable cross-head and a piston for moving longitudinally in the receiver the pressure thereof being resisted by the said movable cross-head and holding-nuts on the said side rods.

4. The combination of the frame having side rods with trunnion-blocks mounted on the said side rods and having open trunnion-recesses, a removable receiver having trunnions adapted to be received in the said open trunnion-recesses, a piston for moving longitudinally in the said receiver, a die and die-holder for use with the said receiver, and means for holding the die-holder and transmitting the thrust on said die-holder to the said side rods of the frame.

5. The combination of a receiver with a piston for moving longitudinally in the said receiver, a die and shouldered die-holder for use with the said receiver, a cross-head moving longitudinally of the said receiver and having an opening therethrough for the passage of the said die and die-holder, and sliding jaws arranged to move laterally and to engage the shoulder of the die-holder when the die is presented to the receiver.

6. The combination of a frame having side rods with a receiver mounted on the said rods and fixed against longitudinal movement, a piston for moving longitudinally through said receiver, a die and longitudinally-movable die-holder, a cross-head having an opening therethrough for the passage of the said die-holder, a pair of sliding jaws mounted on the face of said cross-head to open and close for the passage and holding of the said die-holder, and mechanism for operating the said jaws.

7. The combination of the frame having the side rods with the movable cross-head arranged to move longitudinally of the said rods, roller-trucks upon which the said cross-head is carried, and tracks upon which the said trucks travel, whereby the weight of the said cross-head is supported by the said tracks without bearing upon the said side rods of the frame.

8. The combination of the frame having side rods with the movable cross-head arranged to move longitudinally of the said rods, nuts on the said rods for receiving the thrust of the said cross-head, and filling-blocks mounted to move laterally to the said rods for interposing between the said nuts and cross-head.

9. The combination of the frame having side rods with the movable cross-head arranged to move longitudinally of the said rods, nuts on the said rods for receiving the pressure brought to bear on the said cross-head, and sliding filling-blocks recessed on one side to receive the side rods of the frame when the said blocks are interposed between the said nuts and cross-head.

10. The combination of the frame having side rods with a receiver mounted on said rods, a piston for moving longitudinally in the said receiver, a die and longitudinally-movable die-holder, a movable cross-head arranged to move longitudinally of the said side rods, sliding jaws arranged on the face of the said cross-head for holding the said jaws, nuts on the said side rods for holding the said cross-head, and filling-blocks for interposing between the said nuts and cross-head.

11. The combination of the frame having an end piece provided with a die-holder passage therethrough with a receiver mounted on the said frame, a piston for moving longitudinally in the said receiver, a die and die-holder arranged to move from the receiver to the die-holder passage in the said end piece, and grasping-jaws mounted on the said end piece adjacent to the said die-holder opening.

12. The combination of a receiver having a longitudinal bore with a longitudinally-moving piston, a die having a cylindrical periphery of a diameter for fitting the said bore, a die-holder having a flat seat for the said die and a cylindrical periphery with a portion thereof of the same size as that of the said die, and a dowel-pin fitted to the said die and die-holder for locating the said die circumferentially on the said die-holder preparatory to its entry into the bore of the said receiver.

13. The combination of the die-holder having a delivery-passage therethrough counterbored at the die-holding end, with a die-backing let into the said counterbore, a dowel-pin fitted to the said backing and die-holder to locate the position of the said backing therein, a die seated on the outer face of the said die-backing and end face of the said die-holder, and means for locating the said die with reference to the said backing.

14. The combination of the frame having an end piece provided with a die-holder opening,
a receiver mounted on the said frame, a piston for moving longitudinally of the said receiver, a die and die-holder arranged to move from the receiver to and through the die-holder opening in the said end piece, grasping-jaws mounted on the said end piece adjacent to the said die-holder opening, and mechanism for moving the die-holder away from the said grasping-jaws.

15. The combination of the frame with a receiver mounted thereon, a longitudinally-movable piston, a movable die-holder, means for holding the said die-holder in position relatively to the receiver, a rack connected with the said die-holder, and a gear-wheel for operating the said rack.

16. The combination of the frame having side rods with the movable cross-head arranged to move longitudinally of the said side rods, roller-trucks upon which the said cross-head is carried, tracks upon which the weight of the said trucks and cross-head is supported, and mechanism for moving the said trucks along the said tracks.

17. The combination of the frame having side rods with the movable cross-head arranged to move longitudinally of the said side rods, trucks and tracks upon which the weight of the said cross-head is sustained without bearing on the said side rods, and the hydraulic ram with its stem connected to the said cross-head for moving longitudinally of the said side rods.

18. The combination of the frame having an end piece provided with a die-holder passage therethrough, with a receiver mounted on said frame, a piston for moving longitudinally of the receiver, a die and die-holder arranged to move from the receiver to the die-holder passage in the said end piece of the frame, grasping-jaws mounted on the said end piece for grasping the die when it is stopped between the confronting faces of the said jaws, and the lever and links for operating the said jaws.

19. The combination of the frame having side rods with the receiver fixed against longitudinal movement thereon, a piston for moving longitudinally of the said receiver, a sliding cross-head arranged to move longitudinally of the said rods, a die and die-holder movable through the said movable cross-head and having a portion arranged to abut against the end of the receiver to limit the movement of the die-holder, and sliding jaws on the said movable cross-head for grasping the said die-holder.

20. The combination of a frame having side rods with the trunnion-blocks clamped against moving longitudinally thereon, the receiver having trunnions by which the said receiver is mounted in the said blocks, the movable cross-head arranged to move longitudinally of the said side rods to and from the said receiver, nuts on the said side rods for holding the said cross-head in place, a ram and piston on that side of the said receiver that is opposite the said movable cross-head, and a hinge connecting the said ram and piston for swinging the piston to one side when the ram is run back.

21. The combination of a frame with a receiver fixed against longitudinal movement thereon, a piston for moving longitudinally through the said receiver, a die and movable die-holder, a cross-head on the frame for supporting the said die, the said cross-head having a die-holder opening passing therethrough, mechanism for moving the said die-holder and die longitudinally of the frame within the said opening to present it to and withdraw it from the said fixed receiver, and means for supporting the said die-holder and die on the said cross-head in engagement with the said receiver.

22. The combination of the frame having horizontally-arranged side rods with the trunnion-blocks clamped against longitudinal movement thereon and having vertically-open trunnion-recesses, a removable receiver adapted to be received in the said vertically-open trunnion-recesses, and the adjustable supports for the said trunnion-blocks arranged underneath the same on that side of the side rods at which the said vertically-open trunnion-recesses are located.

JAMES W. MOSHIER.

Witnesses:
JAMES SHEPARD,
HERBERT S. WOODS.